(12) United States Patent
Hubina et al.

(10) Patent No.: US 6,876,384 B1
(45) Date of Patent: Apr. 5, 2005

(54) PIXEL SELECTIVE WHITE BALANCING

(75) Inventors: Thomas Eugene Hubina, Simi Valley, CA (US); Craig Charles Reinhart, Moorpark, CA (US)

(73) Assignee: Biomorphic VLSI, Inc., Thousand Oaks, CA (US)

( * ) Notice: Subject to any disclaimer, the term of this patent is extended or adjusted under 35 U.S.C. 154(b) by 0 days.

(21) Appl. No.: 09/552,217

(22) Filed: Apr. 19, 2000

(51) Int. Cl.[7] .................................................. H04N 9/73
(52) U.S. Cl. ............................. 348/223.1; 348/222.1; 348/225.1
(58) Field of Search ..................... 348/222.1–225.1, 348/252, 266, 655, 223.1; 358/516; 382/266

(56) References Cited

U.S. PATENT DOCUMENTS

| | | | |
|---|---|---|---|
| 3,971,065 A | | 7/1976 | Bayer |
| 4,595,946 A | | 6/1986 | Uehara et al. |
| 4,736,241 A | | 4/1988 | Murakami et al. |
| 5,216,493 A | | 6/1993 | DiBella et al. |
| 5,398,058 A | * | 3/1995 | Hattori .................... 348/224.1 |
| 5,485,202 A | * | 1/1996 | Ueda ........................ 348/223.1 |
| 5,504,524 A | * | 4/1996 | Lu et al. .................. 348/223.1 |
| 5,530,474 A | | 6/1996 | Takei |
| 5,568,195 A | | 10/1996 | Suzuki |
| 5,619,347 A | * | 4/1997 | Taniguchi et al. .......... 358/516 |
| 5,760,831 A | * | 6/1998 | Tanaka et al. ............ 348/223.1 |
| 5,917,556 A | * | 6/1999 | Katayama ................... 348/655 |
| 5,926,213 A | * | 7/1999 | Hafele et al. ............. 348/223.1 |
| 6,181,374 B1 | * | 1/2001 | Saito et al. ............... 348/223.1 |
| 6,243,133 B1 | * | 6/2001 | Spaulding et al. ....... 348/223.1 |
| 6,249,323 B1 | * | 6/2001 | Van Der Voort ............ 348/655 |
| 6,459,449 B1 | * | 10/2002 | Juen ........................ 348/223.1 |
| 6,630,956 B1 | * | 10/2003 | Toi ............................ 348/273 |
| 6,642,962 B1 | * | 11/2003 | Lin et al. .................... 348/252 |

* cited by examiner

*Primary Examiner*—Wendy R. Garber
*Assistant Examiner*—Kelly L. Jerabek
(74) *Attorney, Agent, or Firm*—Pillsbury Winthrop LLP

(57) ABSTRACT

A system and method for processing data representative of a color image is disclosed. Image data represents an intensity of photoexposure of an imaging array at specific locations in the imaging array and in distinct spectral regions corresponding to color channels. A process identifies "white" regions in the color image by comparing the intensities of photoexposure of groups of associated pixels which are responsive to photon energy in different spectral regions. If the intensities of photoexposure of the pixels in the group of associated pixels are proportionally equivalent, these pixels are determined to be in a white region of the image. White balancing gain coefficients are then based upon the pixel intensity values at pixel locations in the white regions of the image.

17 Claims, 13 Drawing Sheets

| R | G | R | G | R | G | R | G |
|---|---|---|---|---|---|---|---|
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |

Figure 2A

| G | R | G | R | G | R | G | R |
|---|---|---|---|---|---|---|---|
| B | W | B | W | B | W | B | W |
| G | R | G | R | G | R | G | R |
| B | W | B | W | B | W | B | W |
| G | R | G | R | G | R | G | R |
| B | W | B | W | B | W | B | W |
| G | R | G | R | G | R | G | R |
| B | W | B | W | B | W | B | W |

Figure 2B

| Y | C | Y | C | Y | C | Y | C |
|---|---|---|---|---|---|---|---|
| M | W | M | W | M | W | M | W |
| Y | C | Y | C | Y | C | Y | C |
| M | W | M | W | M | W | M | W |
| Y | C | Y | C | Y | C | Y | C |
| M | W | M | W | M | W | M | W |
| Y | C | Y | C | Y | C | Y | C |
| M | W | M | W | M | W | M | W |

Figure 2C

PIXEL SELECTIVE WHITE BALANCING

BACKGROUND

1. Field of the Invention

The embodiments described herein relate to image processing techniques. In particular, these embodiments relate to white balancing multicolored image data.

2. Related Art

Because of the tri-stimulus nature of human color perception, to reconstruct a color image of a scene it is typically necessary to recover at least three color components (typically red, green, and blue or cyan, magenta, and yellow) for each picture element (pixel) in the image. In such color imaging systems, white balance is a critical factor in perceived image quality. White balancing is a process of weighting the intensities of the individual color channels of a composite color system to achieve the greatest fidelity of the image compared to the original scene. An objective of white balancing is for a white object to be imaged with properly proportioned energies in component colors (e.g., red, green, and blue).

Red, green, and blue color channels of a typical electronic imaging device may not be in balance with one another. This imbalance is primarily due to the effects of ambient lighting. Scenes imaged under fluorescent lights may produce image pixel responses that are different from pixel responses of the same scenes imaged under incandescent light or sunlight. Also, although less likely, inaccuracies in the placement of color transmissive filters over an imaging sensor, variations in the circuitry of the imaging sensor that comprise the individual pixels, or variations in the analog-to-digital conversion circuits (assuming separate A/D circuits are used for each color stream) may introduce color imbalance.

Various methods have been employed to achieve white balance. One method involves an inclusion of a white balance sensor (which may separate from, or combined with, a primary imaging sensor) within the system. Here, a camera operator typically points the white balance sensor at a white reference surface to extract reference color information. In another method, the imaging system may attempt to perform white balancing based upon image data extracted from a natural scene.

A system that requires the camera operator to image a white reference area to achieve proper white balance can be cumbersome due to the effects of ambient lighting on color channel balance. The operator typically performs the manual white balancing operation every time the ambient light changes. Scene based white balancing provides a more user friendly approach by utilizing information extracted from the imaging sensors independent of image data generated by imaging a white reference surface. This scene based approach places the burden of extracted color information for white balancing on the image processing algorithms not on the camera operator.

One approach to scene based white balance assumes that the average pixel intensity value for each of the color channels throughout any given scene are equivalent. In an imaging system with red, green and blue color channels, for example, one channel is typically designated as the reference channel and the other two channels are balanced to the reference reference channel. The green channel is typically designated as the reference channel due to its greater spectral responsivity over the red and blue channels and its location between red and blue channels in the visible light spectrum. Two separate gain factors are then computed and applied to the intensity values of the red and blue channel pixels to bring them into balance with the reference green channel.

The assumption that the average pixel intensity value for each of the three channels are equal, however, is not always accurate. In a scene where the averages in the imaged object are slightly different, this assumption will cause white areas in the resulting image to take on a colored tint. Therefore, there is a need for a scene based white balancing system which provides a more accurate representation of the colors in an imaged object.

SUMMARY

Briefly, an embodiment of the present invention is directed to a system and method of processing data representative of color information extracted from an array of pixels in an imaging array. The imaging array may include a plurality of pixels which are responsive to photon energy in a distinct spectral region and provides image data. White regions in the image may be identified based upon a dispersion of intensities of photoexposure at groups of associated pixels where each pixel in a group is associated with a distinct one of the plurality spectral regions or color channels. Gain coefficients to be applied to intensities of photoexposure in the image for pixels associated with at least one of the color channels may be based upon an accumulation of the intensities of photoexposure of the pixels associated with the at least one color channel in the white regions of the image. In alternative embodiments, a degree of whiteness is associated with regions of the image captured in the imaging array. The pixel values in a particular pixel region may provide a weighted contribution to the calculation of gain coefficients based upon the degree of whiteness associated with that particular pixel region.

BRIEF DESCRIPTION OF THE FIGURES

FIGS. 2A, 2B and 2C show embodiments of the imaging sensor shown in the embodiment of FIG. 1.

DETAILED DESCRIPTION

Embodiments of the present invention are directed to a system and method for determining gain coefficients to be applied to image data from multiple color channels in an imaging system for carrying out a white balancing process. Upon capturing an image over an exposure period, an imaging array provides data representative of intensities of photoexposure in distinct spectral regions at specific pixel locations on the imaging array. If the intensities of photoexposure of a group of associated pixels of different colors or spectral regions are proportionally equivalent, the group of associated pixels are determined to be in a "white" region of the image. The gain coefficients are determined from the intensity values of the group of associated pixels in the white regions of the image. The gain coefficients may then be applied to the pixel data from the multiple color channels to provide white balanced color image data.

Figure 1:
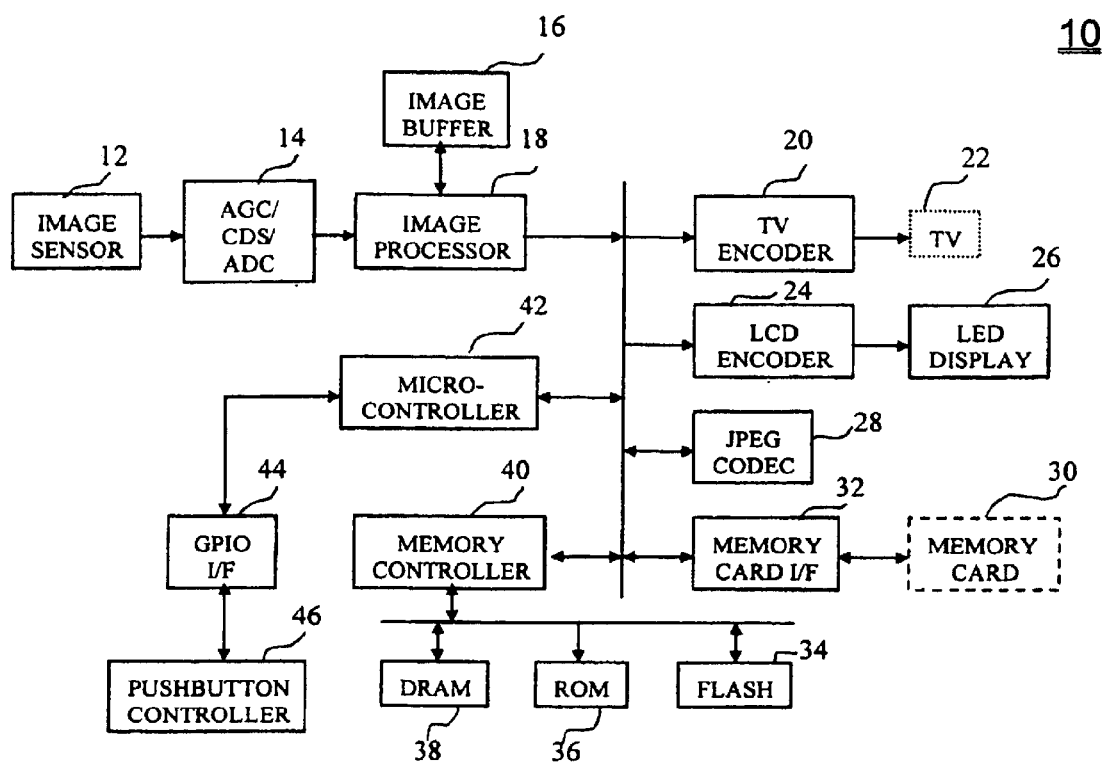
FIG. 1 shows a schematic block diagram of an electronic camera system according to an embodiment.

FIG. 1 shows a block diagram for an electronic camera system according to an embodiment. An imaging sensor 12 is preferably an electronic sensor which receives an image focused thereon by an optical system (not shown). The imaging sensor 12 may include a semiconductor substrate with transmissive filters deposited over selected locations to form pixels. Each pixel is sensitive to photoexposure in a particular spectral region defined by the transmissive properties of the transmissive filter deposited over the associated pixel location. The semiconductor substrate includes circuitry for extracting data which is representative of an intensity of photoexposure of particular pixel elements over an exposure period. The semiconductor substrate may be formed as a charge couple device (CCD) or an active pixel sensor (APS) as described in U.S. Pat. Nos. 5,471,515 and 5,587,596.

Circuitry at section 14 performs functions for automatic gain control, correlated double sampling and analog-to-digital conversion functions to provide digital data representative of the intensity of the photoexposure of pixel elements at specific locations on the imaging sensor 12. For embodiments in which the imaging sensor 12 is of an APS design, the intensity values representative of the photoexposure of the pixel elements in the array may be extracted using pixel readout circuitry described in U.S. patent application Ser. No. 09/274,424, entitled "Pixel Read-Out Architecture," filed on Mar. 22, 1999, assigned to Biomorphic VLSI, Inc., and incorporated herein by reference.

An image processor 18 receives raw digital sensor data captured at the imaging sensor 12 and transforms the raw digital sensor data into a full color image. For color image data defining three colors at each pixel location and representing the pixel intensity value for each color at that pixel location with one eight bit value, each pixel location is associated with 24 bits of data to define the intensity values at each of the three spectral regions associated with the respective three colors in the image. Other embodiments may represent pixel intensity values with ten, twelve or more bits with an associated multiple of bits representing the total color information at the pixel location. Thus, for a three-color image, the image processor 18 preferably provides three overlapping arrays or sub-images of pixel data, each array containing all of the pixel intensity values for an associated color channel.

FIG. 1 depicts the image sensor 12, circuitry at section 14 and image processor 13 as separate functions. In one embodiment, these functions may be performed by three corresponding separate integrated circuits. In other embodiments, the image sensor 12, circuitry at section 14 and image processor 18 may be integrated into the same semiconductor substrate. In other embodiments, portions of the functionality of the image processor 18 may be formed in the same semiconductor substrate as the image sensor 12 and the circuitry at section 14 while other portions of the functionality may be formed in a separate semiconductor substrate.

As discussed below with reference to FIG. 3, the image processor 18 executes several processes for transforming the raw digital sensor data into a full color image. According to an embodiment, the image processor 18 reads from and writes to an image buffer 16 during intermediate computations and manipulations of the image data. The image processor 18 may execute the processes for transforming the raw digital sensor data by any one of several commercially available programmable RISC processors or digital signal processors. Alternatively, the image processor 18 may have an application specific integrated circuit (ASIC) design.

A JPEG code 28 may provide data compression. Instructions executed by a microcontroller 42 may be stored in a read-only memory (ROM) 36. DRAM 38 or flash memory 34 may store data representative of images processed at the image processor 18. A memory card 30 may then store finished images, serving as an electronic "film," through a memory card interface block 32. An LCD display 26 provides a view finder while a photographer is taking pictures. A serial interface such as an RS-232 serial port or a universal serial bus (USB) (not shown) may couple the electronic camera system 10 to a personal computer system. A television encoder 20 may also couple the electronic camera system 10 to a television set 22.

FIG. 2A shows an embodiment of the imaging sensor 12 which includes pixels for extracting color information in red, green and blue spectral regions. The letters R, G and B represent locations of red, green and blue pixels, respectively. As pointed out above, pixels may be formed by depositing a transmissive filter over specific pixel locations as described in detail in U.S. patent application Ser. No. 09/274,413, entitled "Color Filter Pattern," filed on Mar. 22, 1999, assigned to Biomorphic VLSI, Inc., incorporated herein by reference. The color pattern of pixels distributed over the imaging sensor 12 is shown as having a typical Bayer pattern which is described in U.S. Pat. No. 3,971,065.

FIG. 2B shows an alternative embodiment of the imaging sensor 12 with a red, green, blue and white color pattern where the letters R, G, B and W represent locations of red, green, blue and white pixels, respectively. As discussed in the aforementioned U.S. patent application Ser. No. 09/274,413, the white pixels may be formed in a semiconductor imaging device by maintaining an absence of a transmissive filter deposited over white pixel locations while associated transmissive filters are deposited over the red, green and blue pixel locations. FIG. 2C shows an additional embodiment of the imaging sensor 12 with a four color filter pattern having different colors such as cyan, magenta, yellow and white, where the letters C, M, Y and W represent locations of cyan, magenta, yellow and white pixels, respectively.

Figure 3:
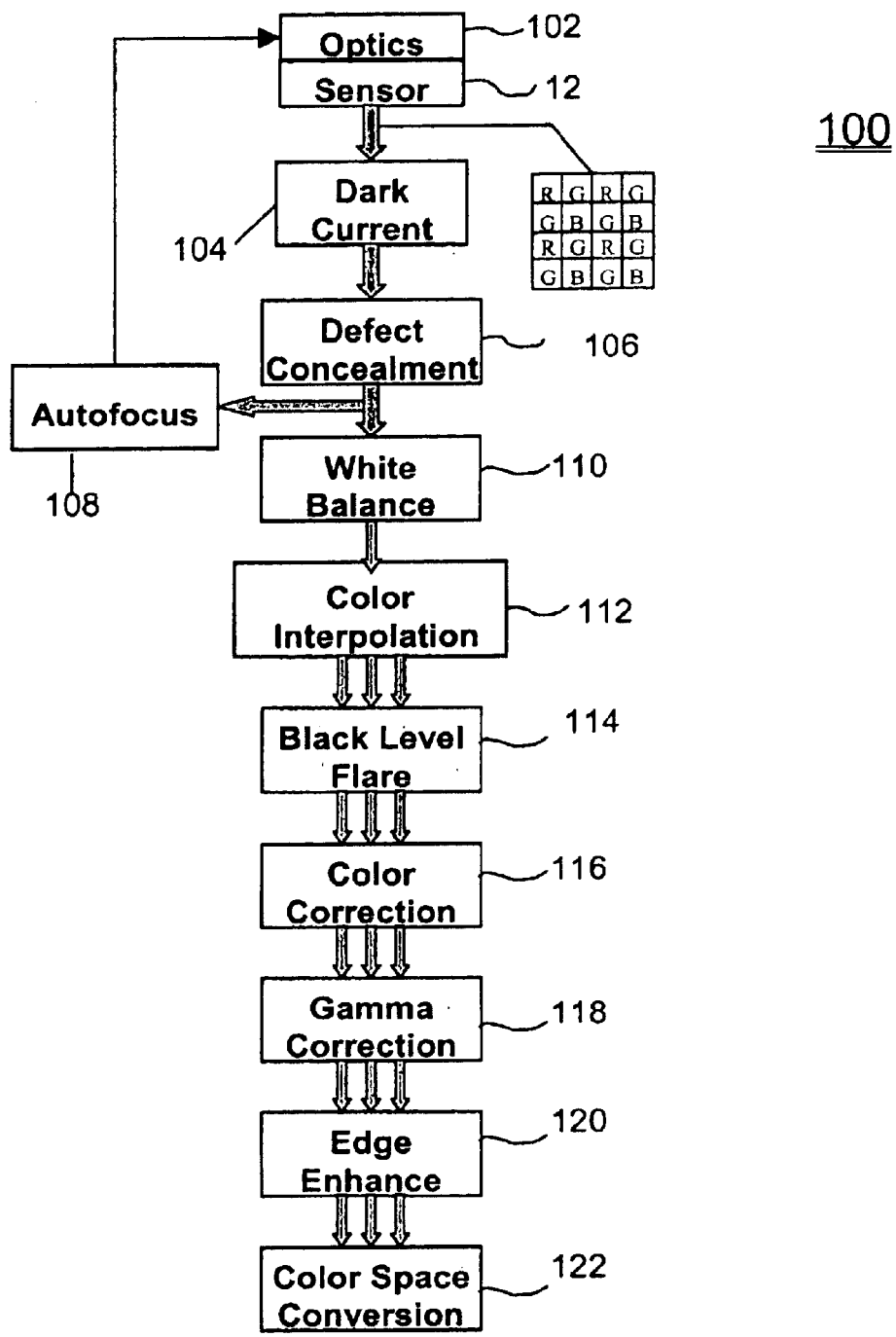
FIG. 3 is a functional flow diagram illustrating processes executed at the image processor shown in FIG. 1 according to an embodiment.

FIG. 3 illustrates a process for providing finished color images from raw digital sensor data. Steps 110 through 122 are preferably performed at the image processor 18 (FIG. 1). According to an embodiment, the image processor 18 performs the steps 110 through 122 with logic circuitry formed in an ASIC (e.g., when the image processor 18 is formed in the same semiconductor substrate as the circuitry at section 14 and image sensor 12). Such logic circuitry may be formed in an ASIC using Verilog or VHDL tools.

In other embodiments, the image processor 18 performs the steps 110 through 112 by executing algorithms encoded into computer readable instructions. In this embodiment, the image processor 18 may retrieve the computer readable instructions from the ROM 36 or DRAM 38 or the computer readable instructions may be stored in a programmable ROM (not shown) which is a part of the image processor 18. In other embodiments, the image processor 18 may retrieve the computer readable instructions from a peripheral memory device such as the flash 34, a hard disk drive (not shown) or a floppy disk drive (not shown).

A dark current correction section 104 subtracts dark current components in the raw sensor data received from the imaging sensor 12. Invariably, some of the pixels in the imaging sensor 12 may be defective. A defect concealment section 106 compensates for these defects by, for example, interpolating from neighboring pixels of the same color or replacing the data from the defective pixel with that of the nearest neighboring non-defective pixel of the same color. A defect map is preferably stored in a memory (such as the image buffer 16) to maintain a record of a defective pixel in the imaging sensor 12.

FIG. 3 illustrates a process of white balancing at step 110 followed by a process of color interpolation at step 112. White balancing at the step 110 includes the calculation of gain coefficients to be applied to the pixel intensity data from each of the color channels to correct for the aforementioned problem of unbalanced color information in the image data. Processes for white balancing are discussed below with reference to particular embodiments of the present invention.

Embodiments of the imaging sensor 12 illustrated in the above mentioned U.S. patent application Ser. No. 09/274,413 receive color intensity information at each pixel location data for a distinct color or spectral region. Therefore, at any particular pixel location color information is collected for a single color. Color information for the other color channels is not collected at the particular pixel location. The process of color interpolation at step 112 provides pixel intensity value for each of the color channels at each pixel location. This may be performed by a process of color selection whereby the imaging sensor 12 provides color information for one particular color channel at a particular pixel location, and color data extracted at adjacent pixel locations provides the color information for the other color channels as described in detail in U.S. patent application Ser. No. 09/482,270, entitled "Color Selection for Sparse Color Image Reconstruction," filed on Jan. 13, 2000, assigned to Biomorphic VLSI, Inc., and incorporated herein by reference. Alternatively, step 112 may perform a color interpolation process to provide image data for all colors at a pixel location as described in U.S. patent application Ser. No. 09/482,844, entitled "Continuity Condition in Color Interpolation," filed on Jan. 13, 2000, assigned to Biomorphic VLSI, Inc., and incorporated herein by reference. The color interpolation step 112 preferably provides a component sub-image for each color channel.

At step 114, the image processor 18 performs black level flare processing to remove any bias in the intensity values resulting from, for an example, an overexposure due to camera flash. Such black level flare processing may be performed using algorithms which are well known in the art. Each pixel of a particular color or spectral region may also be responsive to photon energy which is outside of the spectral region associated with the pixel, introducing a color error. At step 116, the image processor 18 performs color correction to account for any such errors in the pixel data.

The image processor 18 may then perform a gamma correction process at step 118 which compensates for non-linearities in display devices. Here, the image data may be adjusted for a display onto a CRT device such as a television screen or computer monitor using a standard gamma of 2.2, as specified in the ITU-RBT.709 standard.

The processes of color interpolation at step 112 and white balance at step 110 may blur certain edges in the image. Step 120 preferably enhances edges in the image which may have been blurred in the color interpolation and white balance processing.

Finally, the image processor 18 converts the color channels of the digital image, red, green and blue, for example, to a different color space such as YcbCr color space. The embodiment of FIG. 3 shows the process of white balancing at step 110 occurring prior to the process of color interpolation at step 112. Here, the white balancing process at step 110 provides image data of a single color at each pixel location corresponding with the arrangement of pixel colors on the imaging sensor 12. The process of color interpolation then converts this image data into data representative of multiple overlapping sub-images corresponding to the number of different colors of pixels on the imaging sensor 12. Each of these sub-images includes data representative of pixel intensity at each location in the sub-image for a color or spectral region associated with the sub-image. Thus, in the embodiment of the imaging sensor 12 as shown in FIG. 2A, the color interpolation process at step 112 will provide data representative of three sub-images corresponding to red, green and blue.

In an alternative embodiment, the process of color interpolation may precede the process of white balancing. Here, immediately following the process of defect concealment at step 106, the color interpolation process converts the image data with pixel data for a single color at each pixel location into multiple overlapping sub-images. The process of white balancing is then performed over the data representative of all of the sub-images provided by the color interpolation process.

Embodiments of the present invention are directed to a system and method for performing the white balancing process at step 110 as shown in the embodiment of FIG. 3 and, in an alternative embodiment, performing white balancing following color interpolation. Preferred embodiments of the white balancing process determine which pixels of the captured image are in a "white" region of the image. Groups of associated pixels of the different colors spanning the color space captured at the imaging sensor 12 having proportionally equivalent energy are identified as being in a white region of the image. The white balancing process calculates gain coefficients to be applied to the image data based upon the average intensity values of the pixels in the white regions of the image for each color channel. The calculated gains may then be applied to the image data over the entire image to provide a white balanced image.

In a step of identifying the white regions of the image, the white balancing process determines groups of associated pixels and compares the pixel intensity values collected at the pixel locations of the associated pixels. In the embodiment in which the white balancing process follows color interpolation, a group of associated pixels includes pixels in the different sub-images at the same overlapping pixel location. Thus, if while balancing is performed on overlapping sub-images of red, green and blue pixels, each group of associated pixels will include a red pixel selected from a red sub-image, a green pixel selected from a green sub-image and a blue pixel selected from a blue sub-image, all being at the same overlapping pixel location in their respective sub-images. In the embodiment in which the white balancing process precedes the color interpolation process, as shown in FIG. 3, the white balancing process at step 110 determines each group of associated pixels as spatially neighboring pixels by selecting pixels which are adjacent to pixels of a reference color channel.

Step 110 may process color image data stored in one or more arrays in a memory associated with the image processor 18 (FIG. 1) to provide white balanced color image data. Hence, step 110 of this embodiment stores the white balanced color image having data representative of an intensity of one or more spectral regions associated with each pixel location in the imaging sensor 12 data in the memory for further processing. In other embodiments, step 110 may process image data in a streamed fashion by, for example, processing the image in sets of pixel lines or as a processing stage in a pipeline process. Here, step 110 may store in a memory, at any one time, only that image data required to process a portion of the image. The remaining image data is processed and stored during earlier or later stages.

Figure 4:
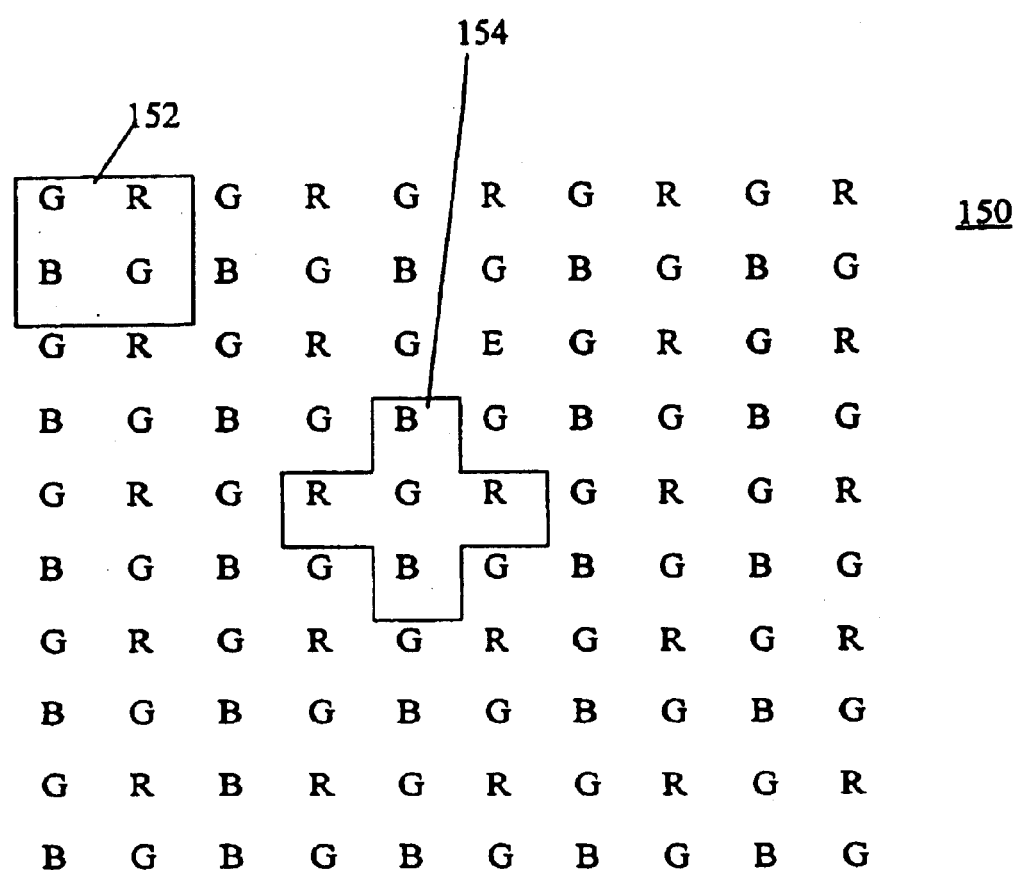
FIG. 4 shows a pattern of pixel data at locations in an image for illustrating a process of determining spatially neighboring pixels according to an embodiment.

FIG. 4 shows a representation of digital image data provided by the process for defect concealment at step 106 (FIG. 3) received at the white balancing process at step 110. The letters R, G and B identify the specific color channel corresponding to each pixel location in a Bayer pattern. There are twice as many green pixels as there are red or blue pixels. The reference channel is preferably chosen as green since green has a greater spectral responsivity over the red and blue, and is located between red and blue in the visible light spectrum. Alternatively, either the red channel or blue channel may serve as the reference channel.

The pixels in the data mapping 150 may be associated into sets of spatially neighboring pixels using any one of several approaches. For example, the pixels may be initially grouped with two green pixels, a red pixel and a blue pixel as shown in grouping 152. The pixel intensity values at the green pixel locations are then compared with the intensity values at the red and blue pixel locations to determine whether the four grouped pixels are in a white spectral region. This is accomplished by determining whether the pixel intensity values are proportionally equivalent as discussed below. In one embodiment, the pixel intensity values at two green pixel locations in grouping 152 are first averaged and then compared with the pixel intensity values of the red and blue pixels in the grouping 152. Alternatively, the four pixels in the grouping 152 are formed into two sub-groupings, each sub-grouping having the pixel data for one of the green pixels in the grouping 152 and the pixel intensity values of each of the red and blue pixels in the grouping 152. The remaining pixel data shown in FIG. 4 may then be partitioned into groups of four pixels and illustrated by grouping 152 for determining spatially neighboring pixels making up a group of associated pixels.

As illustrated in alternative grouping 154, the pixel intensity values for each green pixel may be initially grouped with the pixel intensity values for each of the adjacent pairs of red and blue pixels. In one embodiment, the pixel intensity values of the pair of blue pixels in the grouping 154 are averaged and the pixel intensity values of the pair of red pixels are averaged. These averaged pixel intensity values then form the basis of comparison of the intensity values of the spatially neighboring pixels in the grouping 154. Alternatively, four sub-groupings of spatially neighboring pixels may be formed from the grouping 154 by associating the green pixel in every combination of red and blue pixels in the grouping 154. This analysis can then be repeated for determining sets of spatially neighboring pixels corresponding to each of the green pixels as described with reference to the grouping 154. While groupings 152 and 154 illustrate two particular methods for determining spatially neighboring pixels in the pixel data mapping 150, it is understood that other groupings can be used to determine spatially neighboring pixels in the white balancing process without departing from the embodiments of the present invention.

The analog-to-digital conversion circuitry at section 14 (FIG. 1) preferably quantizes the exposure intensity values for each of the pixels in the imaging sensor 12 into fixed length binary words as discussed in the aforementioned U.S. patent application Ser. No. 09/274,424. In an embodiment in which the intensity value for each pixel is quantized into eight bit words, the pixel intensity values at each pixel location have one of 256 discrete values from 0–255. Other embodiments may provide pixel values quantized into ten bits or twelve bits to allow each pixel intensity value to assume additional values. The image processor 18 may maintain this quantization throughout the processing steps shown in FIG. 3. However, the process of white balancing described herein is also applicable to systems in which the quantization of the pixel intensity values changes from that provided by the initial analog-to-digital conversion.

FIGS. 5 through 8 illustrate a process of determining whether a group of associated pixels are in a white region of the image captured at the imaging sensor 12. The dark arrows on FIGS. 5 through 8 identify color component pixel intensity values for the group of associated pixels on a scale of 0–255, corresponding with eight bit pixel intensity values. In this embodiment, pixels from three color channels, red, green and blue are being white balanced. However, it is understood that this process may also be applied to identifying which groups of associated pixels are in a white region in a different color space having more than three color channels or colors other than red, green and blue.

In an initial step of the process for determining whether a group of associated pixels are in a white region of the image, the intensity value of the pixel from the reference channel, being green in the presently illustrated embodiment, is preferably within a minimum and maximum intensity value defining a reference green window. If a green pixel in a group of associated pixels has a pixel intensity value which is outside of the reference green window, the group of associated pixels is not considered to be in a white region of the image. This disqualifies groups of associated pixels (from being in a white region of the image) whose green response is inaccurate due to limitations of a dynamic range of the imaging sensor 12. For example, pixels whose green component is too bright may be artificially white and skew the white balance gain factors toward green, giving the resulting image a greenish tint.

Figure 5:
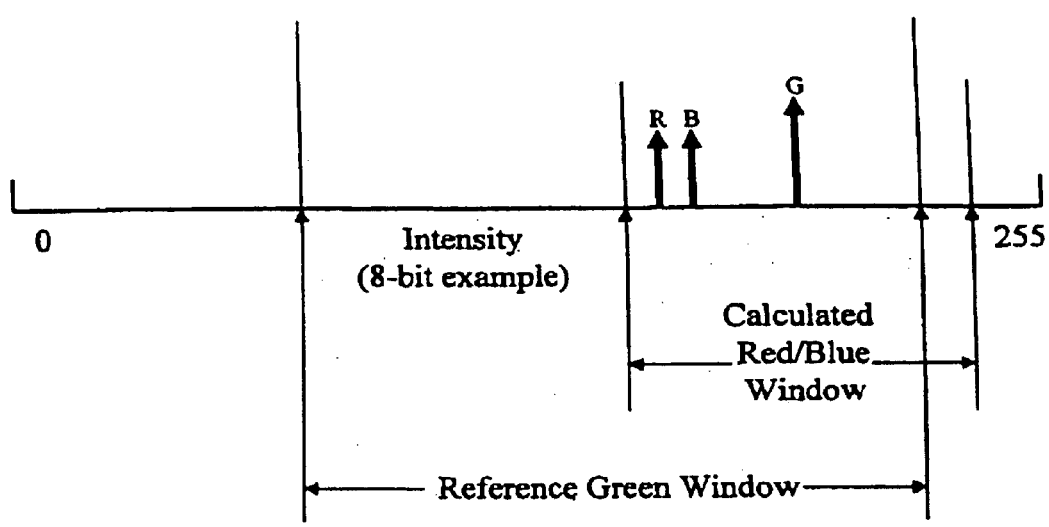
FIGS. 5 through 8 illustrate the process of identifying which pixels are in a white region of an image for determining gain factors in the white balance step shown in FIG. 3.
Figure 6:
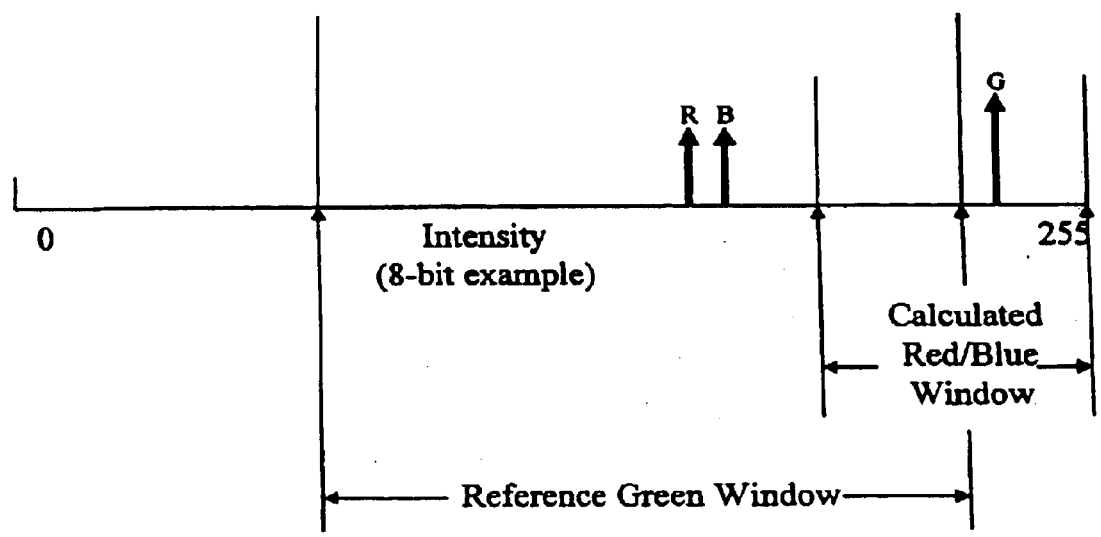
Figure 7:
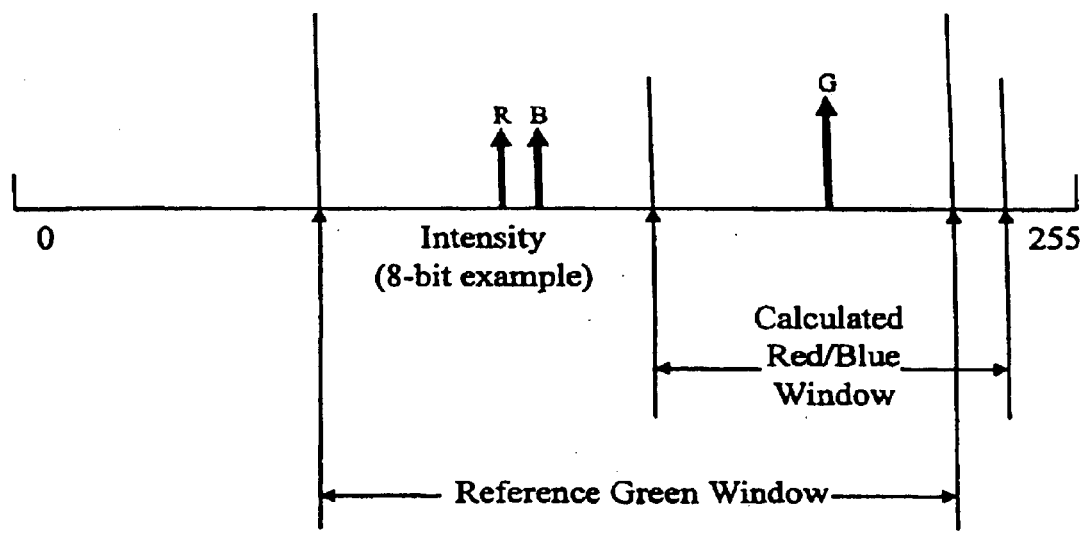
Figure 8:
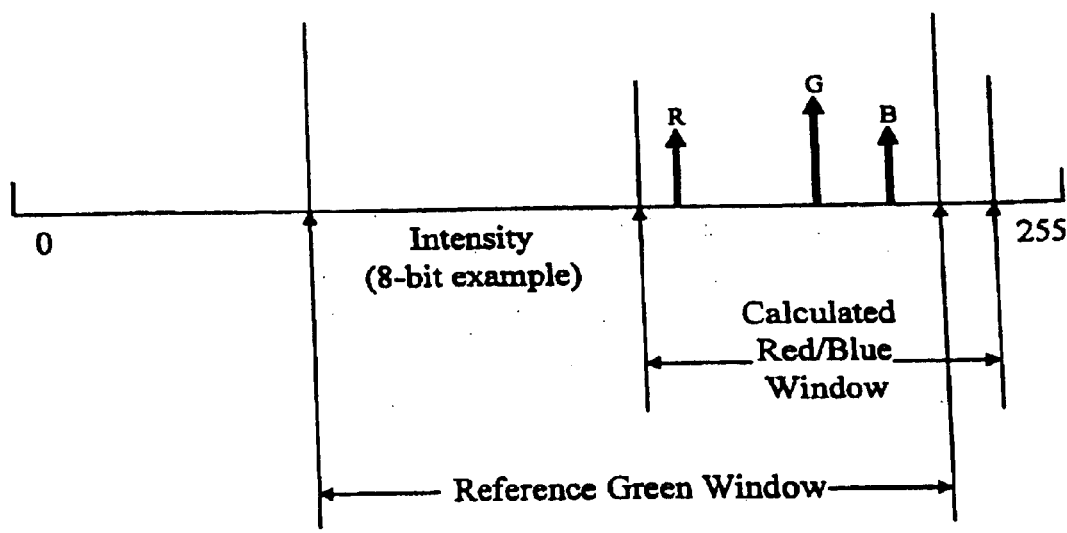

In the illustrated embodiment, the reference green window is defined as lying between the values 127 and 217. However, the reference green window may be defined by other minimum and maximum values. FIGS. 5, 7 and 8 illustrate cases in which the green pixel of a group of associated pixels falls within the reference green window and FIG. 6 illustrates a case in which the pixel intensity value of a green pixel exceeds the upper bound of the reference green window.

Following a determination that the pixel intensity value of a green pixel is within the reference green window, pixel intensity values of the associated red and blue pixels are compared with the intensity value of the green pixel. As shown in FIGS. 5 through 8, a calculated red/blue window is determined based upon the intensity value of the green pixel. The calculated red/blue window preferably identifies red and blue pixel values which provide a ratio with the pixel value associated with the reference green pixel within a desired range. In the embodiment illustrated in FIGS. 5 through 8, the calculated red/blue window is defined as a region centered about the green pixel intensity value and extending +/−45% of the green pixel intensity value. For example, with a green pixel intensity value of 187, the calculated red/blue window will extend from the value of 103 to 271. The red and blue pixel intensity values are within a calculated red/blue window in the cases illustrated in FIGS. 5 and 8.

The specific values used, including the window sizes and placements, in the example above in connection with FIGS. 5 through 8 are merely provided for illustration purposes. It should be understood that other values can be selected based upon the specific characteristics of the imaging sensor being used.

For those groups of associated pixels in which 1) the green pixel intensity values are within the reference green window and 2) the red and blue pixel intensity values are within the calculated red/blue window, the closeness of the red and blue pixel intensity values is evaluated. According to an embodiment, the group of associated pixels are further evaluated to determine whether the difference between the red and blue pixel intensity values is less than 30% of the entire range. In the embodiment illustrated in FIGS. 5 through 8, the red and blue pixel intensity values must be less than 77 apart. FIG. 5 illustrates a case in which the pixel intensity values of a group of associated pixels meet all three criteria for being selected as being in a white region of the image: the green pixel intensity value is within the green reference window; the red and blue pixel intensity values are within the calculated red/blue window; and the difference between the red and blue pixel intensity values is no greater than 30% of the entire range from 0 to 255.

FIG. 6 illustrates a case in which the green pixel intensity value is outside the green reference window and the red and blue pixel intensity values are outside the calculated red/blue window. FIG. 7 illustrates a case in which the green pixel intensity value is within the green reference window, but the red and blue pixel intensity values are outside of the calculated red/blue window. FIG. 8 illustrates a case in which the green pixel intensity value is within the green reference window and the red and blue pixel intensities are within the calculated red/blue window. However, FIG. 8 shows that the red and blue pixel intensity values are more than 77 (or 30% of the entire range from 0 to 255) apart. Therefore, the group of associated pixels shown in FIG. 8 are not identified as being in a white region of the captured image.

FIGS. 5 through 8 illustrate one particular technique for determining whether a group of associated pixels are in a white region by evaluating a dispersion of the pixel intensity values. It should be understood by those of ordinary skill in the art that other techniques may be employed for evaluating a dispersion of the pixel intensity values of groups of associated pixels to identify pixel intensity values which are proportionally equivalent and indicative of a white region of the image.

With the green channel being the reference channel in the presently illustrated embodiment, white balancing is performed on the remaining red and blue color channels relative to the reference green channel. Gains are applied to the intensity values of all red and blue pixels in the image (i.e., all pixels not belonging to the reference color channel) as follows:

$$R_{out}(i,j) = R(i,j) * R_{bal} \quad (1)$$

$$B_{out}(i,j) = B(i,j) * B_{bal} \quad (2)$$

Where:

$R_{out}(i,j)$ is the white balanced pixel intensity value for the red pixel at the location ith row and jth column location in the image;

$B_{out}(i,j)$ is the white balanced pixel intensity value for the blue pixel at the location ith row and jth column location in the image;

$R(i,j)$ is the pre-white balanced pixel intensity value for the red pixel at the location ith row and jth column location in the image;

$B(i,j)$ is the pre-white balanced pixel intensity value for the blue pixel at the location ith row and jth column location in the image;

$R_{bal}$ is the white balancing gain coefficient applied to the pre-white balanced pixel intensity values of all red pixels in the image; and $B_{bal}$ is the white balancing gain coefficient applied to the pre-white balanced pixel intensity values of all blue pixels in the image.

According to an embodiment, the white balancing gain coefficients $R_{bal}$ and $B_{bal}$ are determined as follows:

$$R_{bal} = G_{Wavg} / R_{Wavg} \quad (3)$$

$$B_{bal} = G_{Wavg} / B_{Wavg} \quad (4)$$

Where:

$G_{Wavg}$ is the average pixel intensity value of the green pixels (i.e., pixels of the reference channel) which are determined to be in the "white" regions of the image;

$R_{Wavg}$ is the average pixel intensity value of the red pixels which are determined to be in the "white" regions of the image; and $B_{Wavg}$ is the average pixel intensity value of the blue pixels which are determined to be in the "white" regions of the image.

The values of $R_{Wavg}$, $G_{Wavg}$ and $B_{Wavg}$ may be determined using any of several different techniques applying the principle of determining which pixels are in a white region of the image, and averaging the intensity values in each channel over all pixels in the white region. In the illustrated embodiment, $R_{Wavg}$, $G_{Wavg}$ and $B_{Wavg}$ are determined as follows:

$$R_{Wavg} = R_{Wacc} / R_{Wcount} \quad (5)$$

$$G_{Wavg} = G_{Wacc} / G_{Wcount} \quad (6)$$

$$B_{Wavg} = B_{Wacc} / B_{Wcount} \quad (7)$$

Where:

$R_{Wacc}$ is the accumulation of the pixel intensity values for all red pixels in the "white" regions of the image;

$R_{Wcount}$ is the number of red pixels in the "white" regions of the image;

$G_{Wacc}$ is the accumulation of the pixel intensity values for all green pixels in the "white" regions of the image;

$G_{Wcount}$ is the number of green pixels in the "white" regions of the image;

$B_{Wacc}$ is the accumulation of the pixel intensity values for all blue pixels in the white regions of the image; and $B_{Wcount}$ is the number of blue pixels in the white regions of the image.

When the image data is represented in separate component sub-images in which each component sub-image defines a pixel intensity value at each pixel location for a color channel associated with the sub-image (e.g., when the white balancing process is performed after a process of color interpolation), the values of $R_{Wacc}$, $G_{Wacc}$ and $B_{Wacc}$ may be determined by accumulating the pixel intensity values of all pixels of the corresponding sub-image which are in a white region of the image. It therefore follows that the values $R_{Wcount}$, $G_{Wcount}$ and $B_{Wcount}$ are determined by counting the number of pixels in the corresponding sub-image which are in a white region of the image.

In the embodiment in which white balancing is performed on pixel intensity data represented as single color pixel intensity values at each pixel location in the image (e.g., when the white balancing process is performed on image data extracted from a Bayer pattern imaging array prior to a process of color interpolation), the values of $R_{Wacc}$, $G_{Wacc}$ and $B_{Wacc}$ may be determined by separately accumulating for each color channel the pixel intensity values of all pixels of the corresponding of the corresponding color which are in a white region of the image. It therefore follows that the values $R_{Wcount}$, $G_{Wcount}$ and $B_{Wcount}$ are determined by counting the number of pixels of the corresponding color channel which are in a white region of the image.

The values of $R_{Wacc}$, $G_{Wacc}$, $B_{Wacc}$, $R_{Wcount}$, $G_{Wcount}$ and $B_{Wcount}$ may be calculated according to the following steps of pseudo code:

```
100   R_Wacc = 0
110   G_Wacc = 0
120   B_Wacc = 0
130   initialize G_high
140   initialize G_low
150   initialize RB_threshold
160   determine K groups sets of associated R, G and B pixels of the
      image data
170   for every of associated pixels from l = 1 to K,
180       if (G(l) > G_low) and (G(l) < G_high)
190           compute RB_high from G(l)
200           compute RB_low from G(l)
210           if (R(l) > RB_low) and (R(l) < RB_high) and (B(l) > RB_low)
              and (B(l) < RB_high)
220               if (abs(R(l) - B(l)) < RB_threshold)
230                   R_Wacc = R_Wacc + R(l)
240                   R_Wcount = R_Wcount + 1
250                   G_Wacc = G_Wacc + G(l)
260                   G_Wcount = G_Wcount + 1
270                   B_Wacc = B_Wacc + B(l)
280                   B_Wcount = B_Wcount + 1
290               endif;
310           endif;
320       endif;
330   Next l
```

Steps 100 to 150 initialize values which determine the average intensity values of the red, green and blue pixels which are determined to be in a white region of the image according to equations (5), (6) and (7). Step 160 determines groups of associated pixels for performing a comparison of intensity values. In the embodiment in which white balancing is performed on pixel intensity data of a composite of sub-images (e.g., following the color interpolation at step 112), step 160 forms each group of associated pixels by selecting one pixel in each sub-image from the same pixel location. In the embodiment in which white balancing is performed on pixel intensity represented as single color pixel intensity values at each pixel location in the image (e.g., when the white balancing process is performed on image data extracted from a Bayer pattern imaging array prior to a process of color interpolation), step 160 may form the groups of associated pixels as discussed above with reference to FIG. 4.

Steps 180 through 200 initialize the reference green window and the calculated red/blue window as discussed above with reference to FIGS. 5 through 8. Steps 210 through 280 determine whether pixels in the groups of associated pixels are in white regions of the image, and then adjust the values used to determine the average pixel intensity values of the color channels. In particular, step 180 determines whether a green pixel in the group 1 has an associated pixel intensity value within the reference green window. Steps 180 and 190 determine the red/blue window and step 200 determines whether the red and blue pixel intensity values in the group 1 are within the red/blue window. Step 210 determines whether the pixel intensity values of the red and blue pixels in the group 1 are similar enough to determine that the pixels in the group of associated pixels are in a white region of the image. If so, the pixel intensity values of the red, green and blue pixels are added to the accumulation of the intensities of the red, green and blue pixels in the white regions of the image.

Figure 9:
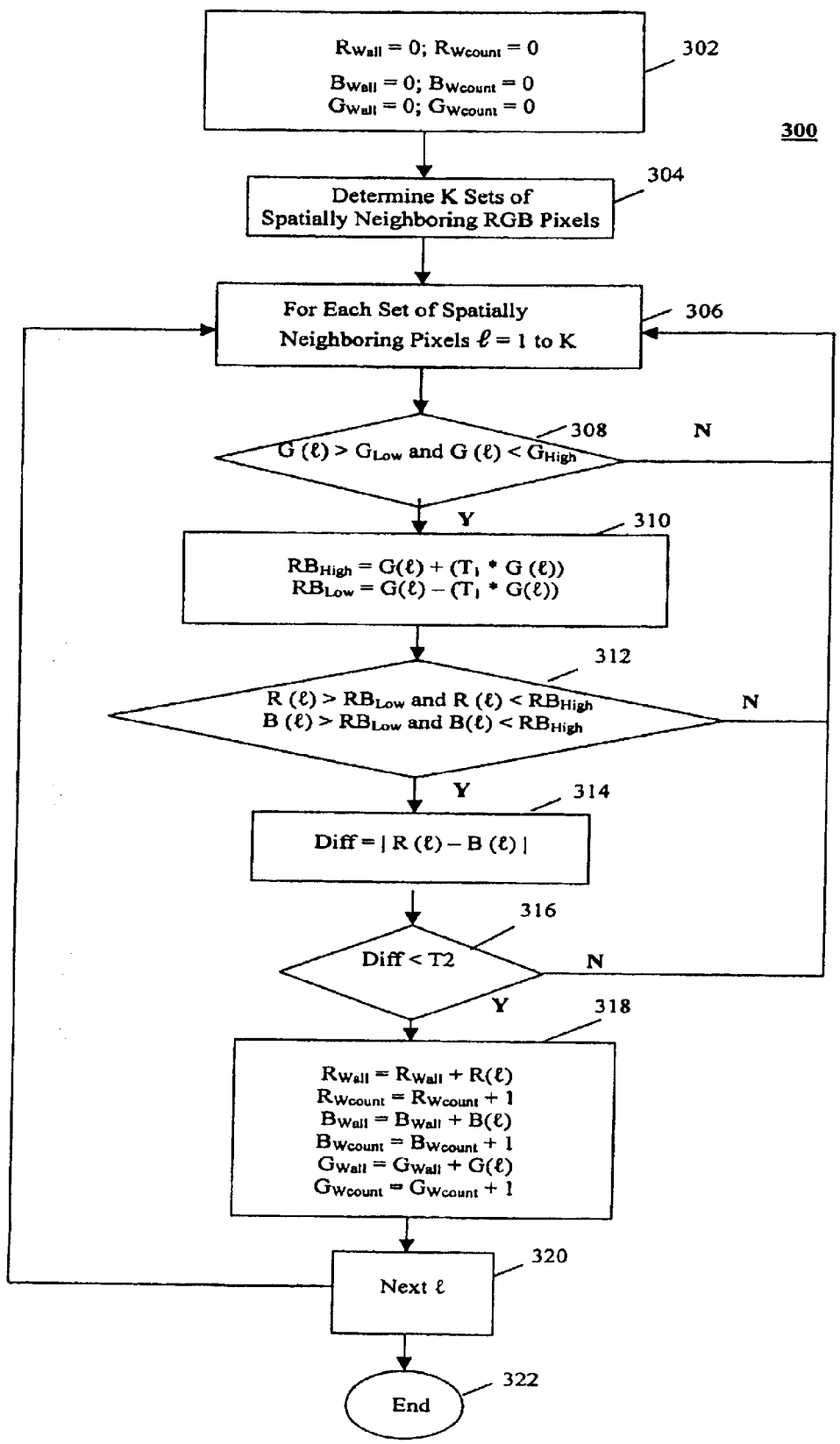
FIG. 9 shows a functional flow diagram illustrating steps in the process of computing gain factors to be used in white balancing multiple color channels in an imaging system according to one embodiment.

FIG. 9 shows a functional flow diagram illustrating a process of determining the inputs for determining white balancing gain coefficients in an embodiment in which the pixel intensity data represents separate component sub-images for each color. Steps 308 through 316 determine whether the pixels in the group of associated pixels 1 are in white regions of the image. Step 318 aggregates the pixel intensity values of the red, green and blue pixels in the white regions of the image, and determines counts of the red, green and blue pixels in the white regions of the image. These values may then be used in calculating the white balancing gain coefficients according to equations (3) through (7).

Figure 10:
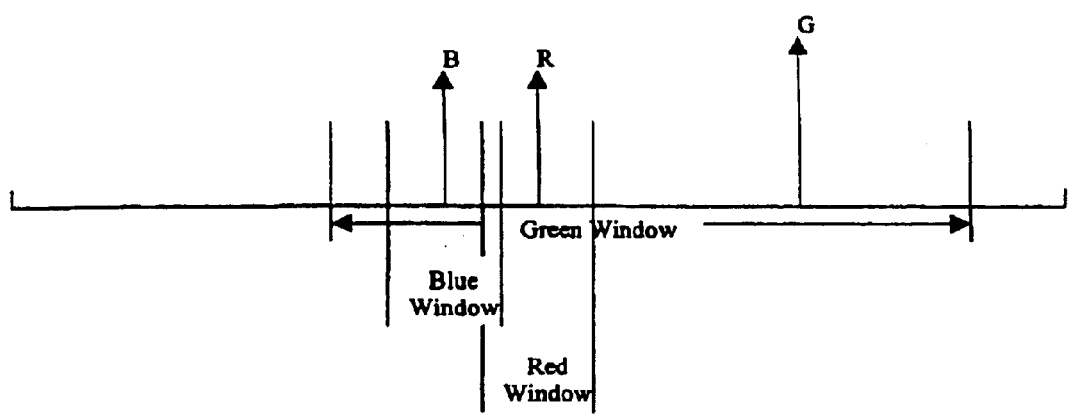
FIG. 10 illustrates an alternative process for identifying which pixels are in a white region of the image in the white balancing step shown in FIG. 3.

FIG. 10 illustrates an alternative embodiment for determining whether a group of associated pixels are in a white region of the image. Like the embodiment illustrated above with reference to FIG. 5, the embodiment of FIG. 10 first determines whether a pixel intensity value of a reference channel (the reference channel being green in the presently illustrated embodiment) is within a predetermined reference window. If this condition is satisfied, a window corresponding to one of the non-reference channels, red for example, is calculated based upon the intensity value of the associated pixel in the spectral region associated with the reference channel. If the intensity value associated with the non-referenced red channel is within the calculated red window, a third window is calculated for evaluation of the pixel value associated with the remaining channel (which is blue in the presently illustrated embodiment) based upon either the reference channel pixel value, the red pixel intensity value or both. If the intensity value associated with the pixel of the remaining color channel is within this third window, it is determined that this group of associated pixels is in a white region of the image. Upon this determination, the intensity values of the group of associated pixels are accumulated as illustrated in steps of pseudocode 230 through 280.

The above-described embodiments apply the white balancing coefficients calculated above in equations (3) and (4) to pre-white balanced intensity values for red and blue pixels in the image. In an alternative embodiment, the white balance gain coefficents calculated in equations (3) and (4) are used for selecting coefficients from a set of pre-computed white balancing coefficients. One of the objectives of a white balancing process is to respond to various lighting scenarios (incandescent, fluorescent, sunlight, etc.). In this embodiment, a set of gain coefficients are pre-computed for each anticipated lighting scenario and stored in memory such as the DRAM 38 or flash 34 (FIG. 1). The white balancing coefficients for the non-reference color channels are calculated as discussed above. The white balancing step 110 (FIG. 3) then selects the set of pre-computed gain coefficients that most closely matches the white balance coefficients for calculated based upon the image data. This ensures that an appropriate set of white balancing coefficients is always applied to the image data.

The embodiments described above are directed to performing white balancing on image data in three component color channels: red; green and blue. However, other embodiments may determine white balancing coefficients for image data in four or more component color channels for data extracted from imaging arrays such as those described above with reference to FIGS. 2B and 2C. Determining white balancing gain coefficients based upon pixel intensity values extracted from pixels in the white regions of an image remains as an objective.

Applying the subject white balancing technique to image data received from an RGBW imaging array such as that shown in FIG. 2B, the green channel may still be chosen as the reference channel. Alternatively, the white channel may be chosen as the reference channel. As with the three color embodiments discussed above, pixels are associated into groups of pixels spanning the color space. In the four color embodiment, each group of associated pixels preferably includes four pixels, each pixel providing a pixel intensity value representative of an intensity of photoexposure in a spectral region associated with one of the four color channels.

The pixel intensity values of the respective pixels in each group of associated pixels may then be used to compute windows as illustrated in FIGS. 5 through 8 to determine whether the group of associated pixels are in a white region of the image. Gain coefficients may then be calculated based upon these the pixel intensity values of pixels in white regions of the image.

The embodiments illustrated above are directed to identifying white regions of an image captured on an array of pixel elements based upon pre-determined relationships (e.g., ratios of intensity values) among pixels forming white regions within the image, and determining white balancing gain coefficients to be applied to pixels in all regions of the image. In alternative embodiments, white balance gain coefficients may be determined according to fuzzy logic rules which associate degrees of whiteness with regions in the image based on both pre-determined relationships (e.g., ratios of intensity values) among pixels and learned relationships among pixels. The pixels of each image region and its associated degree of whiteness may then provide a weighted contribution to the determination of the white balance gain coefficients.

Figure 11:
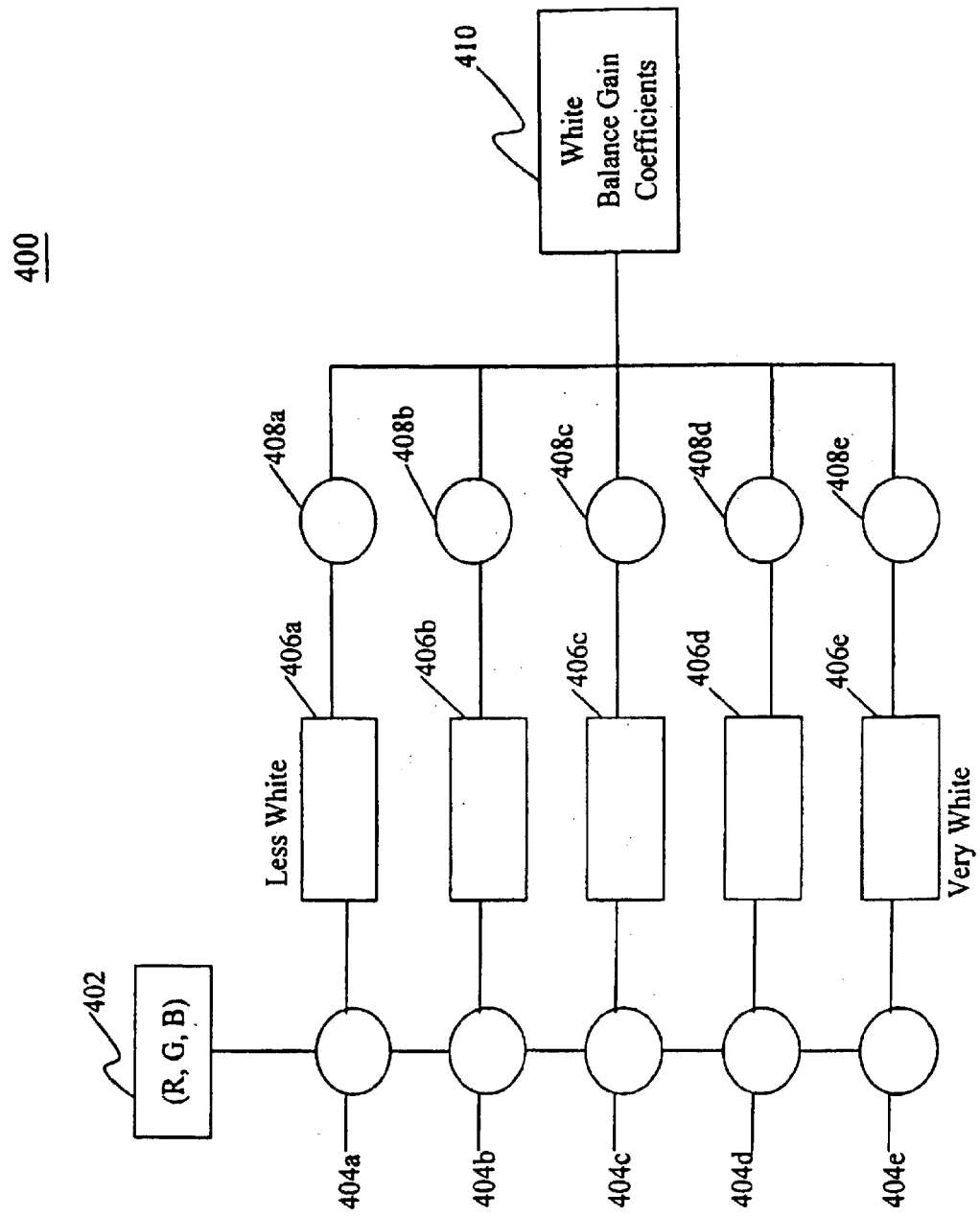
FIG. 11 illustrates an embodiment in which fuzzy logic is used to determine weighting factors in computing white balance gain coefficient based upon degrees of whiteness in regions of an image.

FIG. 11 depicts a process 400 of employing fuzzy logic rules to determine white balance gain coefficients according to an embodiment. Fuzzy rules 404a through 404e evaluate a set of neighboring pixels 402 in a region of the image (e.g., RG and B pixels spanning a color space for the imaging sensor). The fuzzy rules 404a through 404e associate the set of neighboring pixels 402 with a fuzzy set 406 where each fuzzy set 406 corresponds with a degree of whiteness in the image. An appropriate "defuzzification weight" 408 may then be applied to intensity values of the pixels in the set of neighboring pixels 402 based upon the membership of the set of neighboring pixels 402 in a fuzzy set 406 (i.e., associated degree of whiteness in the image). Several sets of neighboring pixels 402 in the image, each weighted by an appropriate defuzzification weight 408, may then contribute to the determination of white balance gain coefficients 410.

For an RGB pixel array, white balance gain coefficients determined according to the fuzzy logic of FIG. 11 may still applied to the pre-white balanced intensity values for red and blue as shown in equations (1) and (2). However, the gains $R_{bal}$ and $B_{bal}$ may be calculated differently as follows:

$$R_{bal} = G_\beta / R_\alpha \qquad (8)$$

$$B_{bal} = G_\beta / B_\gamma \qquad (9)$$

where:

$G_\beta$ is a weighted average pixel intensity value of the green pixels in the image;

$R_\alpha$ is a weighted average pixel intensity value of the red pixels in the image; and $B_\gamma$ is a weighted average pixel intensity value of the blue pixels in the image.

The weighted average pixel intensity values for a color channel are determined by weighting the pixel intensity values of the pixels in a color channel according to the application of defuzzification weights according to a fuzzy function as illustrated with reference to FIG. 11. Equations (10) through (18) below illustrate one particular example of determining the weighted average pixel intensity values according to fuzzy logic. While equations (10) through (18) illustrate one particular embodiment, it should be understood that other techniques of determining weighted the average pixel intensity values according to fuzzy logic may also be used.

$$R_\alpha = \frac{\sum_{i=1}^{R_{count}} R_i * \alpha_i}{\sum_{i=1}^{R_{count}} \alpha_i} \qquad (10)$$

$$G_\beta = \frac{\sum_{i=1}^{G_{count}} G_i * \beta_i}{\sum_{i=1}^{G_{count}} \beta_i} \qquad (11)$$

$$B_\gamma = \frac{\sum_{i=1}^{B_{count}} B_i * \gamma_i}{\sum_{i=1}^{B_{count}} \gamma_i} \qquad (12)$$

$$\alpha_i = f_\alpha(R_i, G_i, B_i) \qquad (13)$$

$$\gamma_i = f_\gamma(R_i, G_i, B_i) \qquad (14)$$

$$\beta_i = f_\beta(R_i, G_i, B_i) \qquad (15)$$

where:

$f_\alpha(R_i, G_i, B_i)$, $f_\beta(R_i, G_i, B_i)$ and $f_\gamma(R_i, G_i, B_i)$ are fuzzy functions between zero and one based upon a degree whiteness in a region of the image including the group of associated pixels $R_i$, $G_i$ and $B_i$.

In one embodiment, one or more of the fuzzy functions $f_\alpha(R_i, G_i, B_i)$, $f_\beta(R_i, G_i, B_i)$ and $f_\gamma(R_i, G_i, B_i)$ are based upon a dispersion of the intensity values $R_i$, $G_i$, and $B_i$ about a weighted average of these intensity values as follows:

$$f_\alpha(R_i, G_i, B_i) = f_\alpha(\phi_i) \quad (16)$$

$$f_\beta(R_i, G_i, B_i) = f_\beta(\phi_i) \quad (17)$$

$$f_\gamma(R_i, G_i, B_i) = f_\gamma(\phi_i) \quad (18)$$

where:

$\phi_i = (a^*R_i - \mu_i)^2 + (G_i - \mu_i)^2 + (c^*B_i - \mu_i)^2$ $\mu_i = (a^*R_i + G_i + c^*B_i)/(1+a+c)$; and a and c are constants for scaling red and blue pixel intensity values to equivalent pixel intensities for green pixels.

According to an embodiment, the argument $\phi_i$ is indicative of a dispersion about $\mu_i$, a weighted average of $R_i$, $G_i$, $B_i$. The fuzzy functions $f_\alpha(\phi_i)$, $f_\beta(\phi_i)$ and $f_\gamma(\phi_i)$ may then be implemented in look-up tables associating ranges of $\phi_i$ with values from zero to one. Such an algorithm for performing white balancing may be implemented in logic similar to that illustrated in the flow diagram of FIG. 9 by associating groups of pixels, determining $\alpha$, $\beta$ and $\gamma$ for each associated group of pixels and determining $R_{bal}$ and $B_{bal}$ based upon $R_\alpha$, $G_\beta$ and $B_\gamma$.

The embodiment illustrated above with reference to equations (10) through (18) is directed to determining $R_\alpha$, $G_\beta$ and $B_\gamma$ from a weighted sum of all pixels in an imaging sensor. In other embodiments, the sets of neighboring pixels 402 (FIG. 11) may be pre-filtered or pre-selected to be in a white region of the image using techniques such as those illustrated above with reference to FIGS. 5 through 8. The intensity values from each of the pre-filtered or pre-selected sets of neighboring pixels may then be weighted according to a degree of whiteness associated with the pre-filtered or pre-selected sets of neighboring pixels in the determination of $R_\alpha$, $G_\beta$ and $B_\gamma$.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method of processing data representative of color information extracted from an array of pixels in an imaging array, the imaging array including a plurality of pixels which are responsive to photon energy in a distinct spectral region, each of the pixels being capable of outputting an intensity value which is representative of an intensity of photoexposure in the spectral region associated with the pixel over an exposure period, the method comprising:

identifying each pixel responsive to photoexposure in a first spectral region having an intensity value between a minimum intensity value and a maximum intensity value to provide a plurality of first pixels, selecting a first pixel from the plurality of first pixels to form a selected first pixel, selecting, for each selected first pixel, at least one pixel associated with a second spectral region to determine at least one associated second pixel for each selected first pixel and selecting at least one pixel associated with a third spectral region to determine at least one associated third pixel for each selected first pixel, and associating the intensity value of the associated second pixel and the intensity value of the associated third pixel with the intensity value of the selected first pixel to determine a matching set therewith, the matching set including the selected first pixel, the associated second pixel, and the associated third pixel, wherein associating the intensity value of the associated second pixel and the intensity value of the associated third pixel with the intensity value of the selected first pixel includes:

determining whether the intensity value of the associated second pixel is within a first range of the intensity value of the selected first pixel, and determining whether the intensity value of the associated third pixel is within a second range of the intensity value of the associated second pixel, and determining a first gain coefficient for application to the intensity values of each of the pixels associated with the second spectral region based upon an accumulation of the intensity values associated with the associated second pixels and determining a second gain coefficient for application to the intensity values of each of the pixels associated with the third spectral region based upon an accumulation of the intensity values associated with the associated third pixels.

2. The method of claim 1, wherein the step of determining the first and second gain coefficients further includes:

determining the first gain coefficent as being proportional to an average intensity value of all of the selected second pixels divided by an average intensity value of each of the selected first pixels; and determining the second gain coefficient as being proportional to an average intensity value of all of the selected third pixels divided by the average intensity value of each of the selected first pixels.

3. The method of claim 1, the method further including:

scaling each of the pixels associated with second spectral region by the first gain coefficient; and scaling each of the pixels associated with the third spectral region by the second gain coefficient.

4. The method of claim 1, wherein each of the pixels is associated with a location on the imaging array, and wherein the selecting step further includes:

selecting the at least one second associated pixel as having the same location as the first pixel; and selecting the at least one third associated pixel as having the same location as the first pixel.

5. The method of claim 1, wherein each of the pixels is associated with a location on the imaging array, and wherein the selecting step further includes:

selecting the at least one second associated pixel as having a first adjacent location to the location of the selected first pixel; and selecting the at least one third associated pixel as having a second adjacent location to the location of the selected first pixel.

6. The method of claim 5, the method further including:

scaling each of the pixels associated with the second spectral region by the first gain coefficient to provide a first scaled intensity value;

scaling each of the pixels associated with the third spectral region by the second gain coefficient to provide a second scaled intensity value;

determining an intensity value of a pixel associated with the second spectral region at the location of the first pixel based upon the first scaled intensity value; and determining an intensity value of a pixel associated with the third spectral region at the location of the first pixel based upon the second scaled intensity value.

7. In a camera, the camera having an imaging array, the imaging array including a plurality of pixels which are responsive to photon energy in a distinct spectral region, each of the pixels being capable of outputting an intensity value which is representative of an intensity of photoexposure in the spectral region associated with the pixel over an exposure period, a lens for focusing an image of an object onto the imaging array, and a processor, the improvement including:

logic for identifying all pixels responsive to photoexposure in a first spectral region having an intensity value between a minimum intensity value and a maximum intensity value to provide a plurality of first pixels;

logic for selecting for each of the first pixels at least one associated second pixel responsive to photoexposure in a second spectral region;

logic for selecting for each of the first pixels at least one associated third pixel responsive to photoexposure in a third spectral region;

logic for associating the intensity value of the associated second pixel and the intensity value of the associated third pixel with the intensity value of the selected first pixel to determine a matching set therewith, the matching set including the selected first pixel, the associated second pixel and the associated third pixel, wherein associating the intensity value of the associated second pixel and the intensity value of the associated third pixel with the intensity value of the selected first pixel includes:

determining whether the intensity value of the associated second pixel is within a first range of the intensity value of the selected first pixel; and determining whether the intensity value of the associated third pixel is within a second range of the intensity value of the associated second pixel; and logic for determining a first gain coefficient for application to the intensity values of each of the pixels associated with the second spectral region based upon an accumulation of the intensity values associated with the selected second pixels and for determining a second gain coefficient for application to the intensity values of each of the pixels associated with the third spectral region based upon an accumulation of the intensity values associated with the selected third pixels.

8. A computer readable medium for use in conjunction with an imaging array, the imaging array having a plurality of pixels which are responsive to photon energy in a distinct spectral region, each of the pixels being capable of outputting an intensity value which is representative of an intensity of photoexposure in the spectral region associated with the pixel over an exposure period, the computer readable medium having computer readable instructions encoded thereon for performing the following:

identifying all pixels responsive to photoexposure in a first spectral region having an intensity value between a minimum intensity value and a maximum intensity value to provide a plurality of first pixels;

for each of the first pixels;

selecting at least one pixel responsive to photoexposure in a second spectral region, the second spectral region being distinct from the first spectral region, to determine at least one associated second pixel and selecting at least one pixel responsive to photoexposure in a third spectral region, the third spectral region being distinct from the first and second spectral regions, to determine at least one associated third pixel;

associating the intensity value of the associated second pixel and the intensity value of the associated third pixel with the intensity value of the selected first pixel to determine a matching set therewith, the matching set including the selected first pixel, the associated second pixel and the associated third pixel, wherein associating the intensity value of the associated second pixel and the intensity value of the associated third pixel with the intensity value of the selected first pixel includes:

determining whether the intensity value of the associated second pixel is within a first range of the intensity value of the selected first pixel; and determining whether the intensity value of the associated third pixel is within a second range of the intensity value of the associated second pixel; and determining a first gain coefficient for application to the intensity values of each of the pixels associated with the second spectral region based upon an accumulation of the intensity values associated with the selected second pixels and determining a second gain coefficient for application to the intensity values of each of the pixels associated with the third spectral region based upon an accumulation of the intensity values associated with the selected third pixels.

9. An image processor for use in conjunction with an imaging array, the imaging array including a plurality of pixels which are responsive to photon energy in a distinct spectral region, each of the pixels being capable of outputting an intensity value which is representative of an intensity of photoexposure in the spectral region associated with the pixel over an exposure period, the image processor comprising:

logic for identifying all pixels responsive to photoexposure in a first spectral region having an intensity value between a minimum intensity value and a maximum intensity value to provide a plurality of first pixels;

logic for selecting for each of the first pixels at least one pixel associated responsive to photoexposure in a second spectral region distinct from the first spectral region;

logic for selecting for each of the first pixels at least one spatially pixel responsive to photoexposure in a third spectral region, the third spectral region being distinct from the first and second spectral regions, to determine at least one associated third pixel;

logic for associating the intensity value of the associated second pixel and the intensity value of the associated third pixel with the intensity value of the selected first pixel to determine a matching set therewith, the matching set including the selected first pixel, the associated second pixel and the associated third pixel, wherein associating the intensity value of the associated second pixel and the intensity value of the associated third pixel with the intensity value of the selected first pixel includes:

determining whether the intensity value of the associated second pixel is within a first range of the intensity value of the selected first pixel; and determining whether the intensity value of the associated third pixel is within a second range of the intensity value of the associated second pixel; and logic for determining a first gain coefficient for application to the intensity values of each of the pixels associated with the second spectral region based upon an accumulation of the intensity values associated with the selected second pixels and for determining a second gain coefficient for application to the intensity values of each of the pixels associated with the third spectral region based upon an accumulation of the intensity values associated with the selected third pixels.

10. A method of processing data representative of a color, image based upon color information extracted from pixels in an imaging array, the imaging array including a plurality of pixels, each of the plurality of pixels being responsive to photon energy in one of a plurality of distinct spectral regions, each of the spectral regions being associated with one of a plurality of color channels, each of the pixels being capable of providing data representative of an intensity of photoexposure in the spectral region and color channel associated with the pixel over an exposure period, the method comprising:
  identifying white regions in the image based upon a dispersion of the intensities of photoexposure at a group of associated pixels in the imaging array, each of the associated pixels being responsive to photoexposure in a distinct one of the plurality spectral regions or color channels, wherein identifying the white regions in the image includes:
    selecting a reference channel from among the plurality of color channels,
    determining groups of associated pixels in the image, each of the groups including at least one reference channel pixel associated with the reference channel and at least one non-reference channel pixel associated with a color channel distinct from the reference channel,
    for each group of associated pixels, associating first and second non-reference channel pixels with each group of associated pixels,
    for each group of associated pixels, determining whether an intensity of photoexposure of the first non-reference channel pixel and an intensity of photoexposure of a second non-reference channel are within a predetermined range about the intensity of photoexposure of the reference channel pixel, and
    determining whether the difference between the intensities of photoexposure of the first and second non-reference channel pixels is less than a predetermined difference, and
  determining gain coefficients to be applied to intensities of photoexposure in the image for pixels associated with at least one of the color channels based upon an accumulation of the intensities of photoexposure of the pixels associated with the at least one color channel in the white regions of the image.

11. The method of claim 10, the method further including:
  calculating intermediate gain coefficients based upon the accumulation of the intensities of photoexposure of the pixels associated with the at least one color channel in the white regions of the image; and
  selecting the gain coefficients to be applied to the intensities of photoexposure in the image from among a plurality of sets of gain coefficients stored in memory based upon a closeness of the intermediate gain coefficients to the selected set of gain coefficients.

12. In a camera, the camera having an imaging array, the imaging array including a plurality of pixels which are responsive to photon energy in a distinct spectral region, each of the pixels being capable of outputting an intensity value which is representative of an intensity of photoexposure in the spectral region associated with the pixel over an exposure period, a lens for focusing an image of an object onto the imaging array, and a processor, the improvement including:
  logic for identifying white regions in the image based upon a dispersion of the intensities of photoexposure at associated pixels, each of the associated pixels being responsive to photoexposure in a distinct one of the plurality spectral regions or color channels, wherein the logic for identifying the white regions in the image includes:
    logic for selecting a reference channel from among the plurality of color channels,
    logic for determining groups of associated pixels in the image, each of the groups including at least one reference channel pixel associated with the reference channel and at least one non-reference channel pixel associated with a color channel distinct from the reference channel,
    for each group of associated pixels, logic for associating first and second non-reference channel pixels with each group of associated pixels,
    for each group of associated pixels,
    logic for determining whether an intensity of photoexposure of the first non-reference channel pixel and an intensity of photoexposure of a second non-reference channel are within a predetermined range about the intensity of photoexposure of the reference channel pixel, and
    logic for determining whether the difference between the intensities of photoexposure of the first and second non-reference channel pixels is less than a predetermined difference, and
  logic for determining gain coefficients to be applied to intensities of photoexposure in the image for pixels associated with at least one of the color channels based upon an accumulation of the intensities of photoexposure of the pixels associated with the at least one color channel in the white regions of the image.

13. The camera of claim 12, the camera further comprising:
  logic for calculating intermediate gain coefficients based upon the accumulation of the intensities of photoexposure of the pixels associated with the at least one color channel in the white regions of the image; and
  logic for selecting the gain coefficients to be applied to the intensities of photoexposure in the image from among a plurality of sets of gain coefficients stored in memory based upon a closeness of the intermediate gain coefficients to the selected set of gain coefficients.

14. A computer readable medium for use in conjunction with an imaging array for receiving an image of an object, the imaging array including a plurality of pixels which are responsive to photon energy in one of a plurality of distinct spectral regions, each of the spectral regions being associated with one of a plurality of color channels, each of the pixels being capable of providing data representative of an intensity of photoexposure in the spectral region and color channel associated with the pixel over an exposure period, the computer readable medium having computer readable instructions encoded thereon for performing the following:
  identifying white regions in the image based upon a dispersion of the intensities of photoexposure at associated pixels, each of the associated pixels being responsive to photoexposure in a distinct one of the plurality spectral regions or color channels, wherein identifying the white regions in the image includes:
    selecting a reference channel from among the plurality of color channels,
    determining groups of associated pixels in the image, each of the groups including at least one reference channel pixel associated with the reference channel and at least one non-reference channel pixel associated with a color channel distinct from the reference channel,
    for each group of associated pixels, associating first and second non-reference channel pixels with each group of associated pixels,
    for each group of associated pixels, determining whether an intensity of photoexposure of the first non-reference channel pixel and an intensity of photoexposure of a second non-reference channel are within a predetermined range about the intensity of photoexposure of the reference channel pixel, and
    determining whether the difference between the intensities of photoexposure of the first and second non-reference channel pixels is less than a predetermined difference, and
determining gain coefficients to be applied to intensities of photoexposure in the image for pixels associated with at least one of the color channels based upon an accumulation of the intensities of photoexposure of the pixels associated with the at least one color channel in the white regions of the image.

15. The computer readable medium of claim 14, the computer readable medium further including computer readable instructions encoded thereon for:
    calculating intermediate gain coefficients based upon the accumulation of the intensities of photoexposure of the pixels associated with the at least one color channel in the white regions of the image; and
    selecting the gain coefficients to be applied to the intensities of photoexposure in the image from among a plurality of sets of gain coefficients stored in memory based upon a closeness of the intermediate gain coefficients to the selected set of gain coefficients.

16. An image processor for use in conjunction with an imaging array, the imaging array including a plurality of pixels which are responsive to photon energy in one of a plurality of distinct spectral regions, each of the spectral regions being associated with one of a plurality of color channels, each of the pixels being capable of providing data representative of an intensity of photoexposure in the spectral region and color channel associated with the pixel over an exposure period, the image processor comprising:
    logic for identifying white regions in the image based upon a dispersion of the intensities of photoexposure at associated pixels, each of the associated pixels being responsive to photoexposure in a distinct one of the plurality spectral regions or color channels, wherein the logic for identifying the white regions in the image includes:
        logic for selecting a reference channel from among the plurality of color channels,
        logic for determining groups of associated pixels in the image, each of the groups including at least one reference channel pixel associated with the reference channel and at least one non-reference channel pixel associated with a color channel distinct from the reference channel,
        for each group of associated pixels, logic for associating first and second non-reference channel pixels with each group of associated pixels,
        for each group of associated pixels, logic for determining whether an intensity of photoexposure of the first non-reference channel pixel and an intensity of photoexposure of a second non-reference channel are within a predetermined range about the intensity of photoexposure of the reference channel pixel, and
        logic for determining whether the difference between the intensities of photoexposure of the first and second non-reference channel pixels is less than a predetermined difference, and
    logic for determining gain coefficients to be applied to intensities of photoexposure in the image for pixels associated with at least one of the color channels based upon an accumulation of the intensities of photoexposure of the pixels associated with the at least one color channel in the white regions of the image.

17. The image processor of claim 16, the image processor further including:
    logic for calculating intermediate gain coefficients based upon the accumulation of the intensities of photoexposure of the pixels associated with the at least one color channel in the white regions of the image; and
    logic for selecting the gain coefficients to be applied to the intensities of photoexposure in the image from among a plurality of sets of gain coefficients stored in memory based upon a closeness of the intermediate gain coefficients to the selected set of gain coefficients.

* * * * *